United States Patent [19]
Orlowski et al.

[11] Patent Number: 4,615,855
[45] Date of Patent: Oct. 7, 1986

[54] PROCESS FOR FORMING COMPOSITE ARTICLE

[75] Inventors: Edward Orlowski, La Mirada; George D. Walker, Brea, both of Calif.

[73] Assignee: Programmed Composites, Inc., Brea, Calif.

[21] Appl. No.: 589,881

[22] Filed: Mar. 15, 1984

[51] Int. Cl.$^4$ ............................................. B29C 33/40
[52] U.S. Cl. ..................................... 264/221; 264/225; 264/227; 264/317; 264/338; 249/91; 249/114 R
[58] Field of Search ....... 264/221, 227, 317, DIG. 44, 264/230, 337, 225, 338; 425/DIG. 12, DIG. 14, 176; 164/34, 35; 249/114 R

[56] References Cited

U.S. PATENT DOCUMENTS

| | | | |
|---|---|---|---|
| 2,941,277 | 6/1960 | Ganz | 264/227 |
| 3,907,949 | 9/1975 | Carlson | 264/DIG. 44 |
| 3,939,898 | 2/1976 | Petro | 264/317 |
| 3,957,382 | 5/1976 | Greuel | 264/317 |
| 4,225,546 | 9/1980 | Ohno | 264/317 |
| 4,388,263 | 6/1983 | Prunty | 425/DIG. 14 |

Primary Examiner—Donald Czaja
Assistant Examiner—Leo B. Tentoni
Attorney, Agent, or Firm—Edgar W. Averill, Jr.

[57] ABSTRACT

A process for forming a hollow, cured composite article. The process includes steps of making a plug from a meltable material. The plug is covered with a polymerizable material and the covered plug is inserted into a cavity formed in a thermally-expansive and heat-resistant polymer held within a rigid container. The almost filled container is covered and the container and part are heated to cause curing of the polymerizable covering. The cured assembly is removed from the thermally-expansive and heat-resistant polymer and heated to an extent sufficient to melt the core.

12 Claims, 11 Drawing Figures

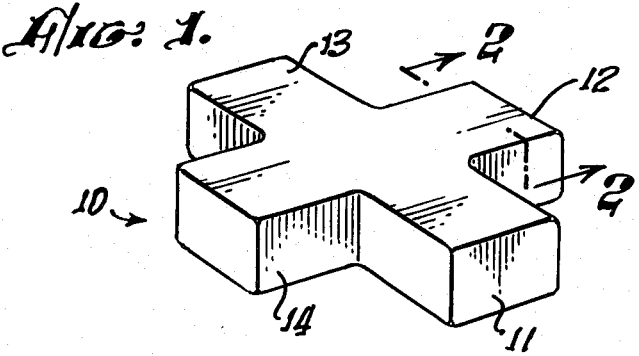
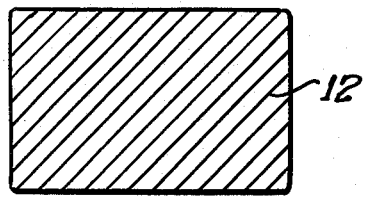
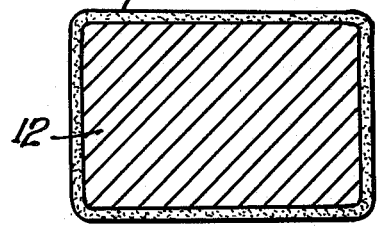
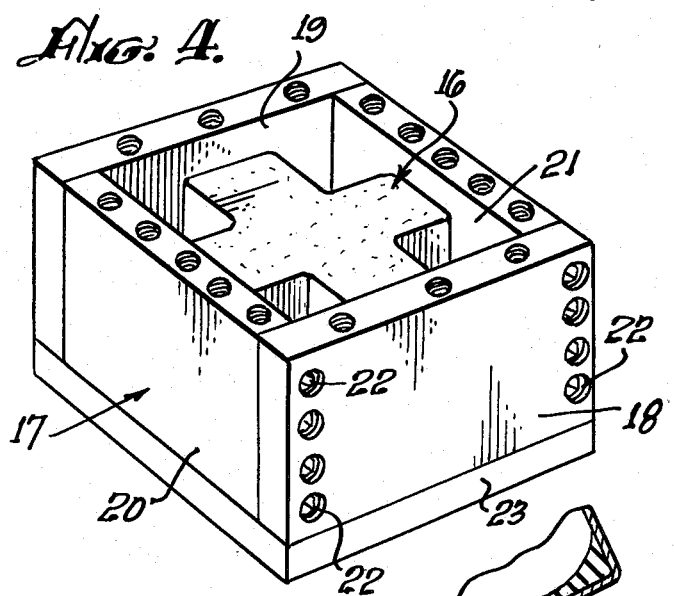
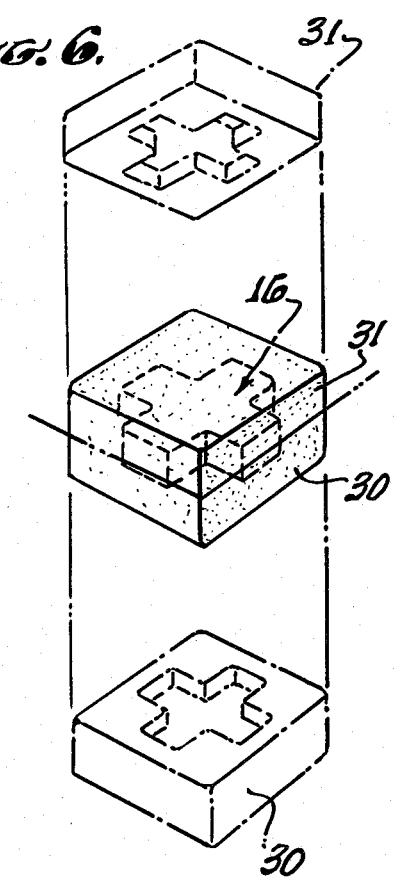
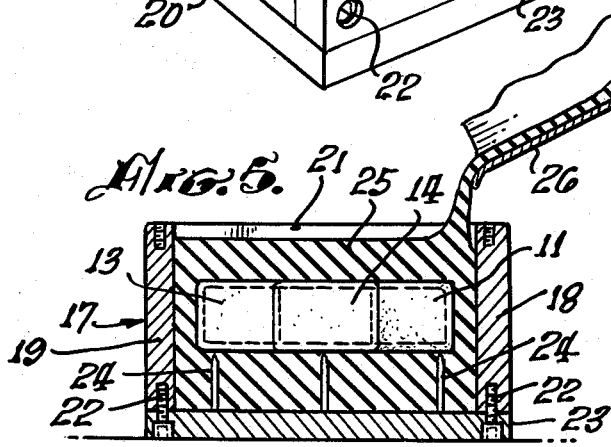

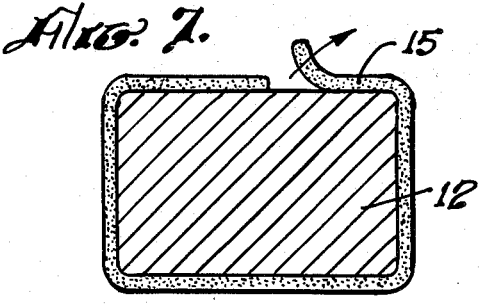
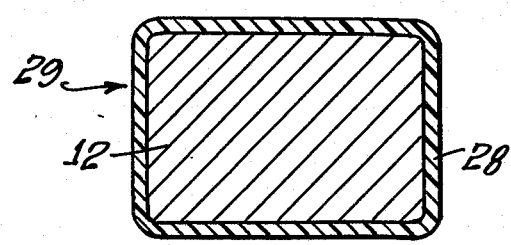
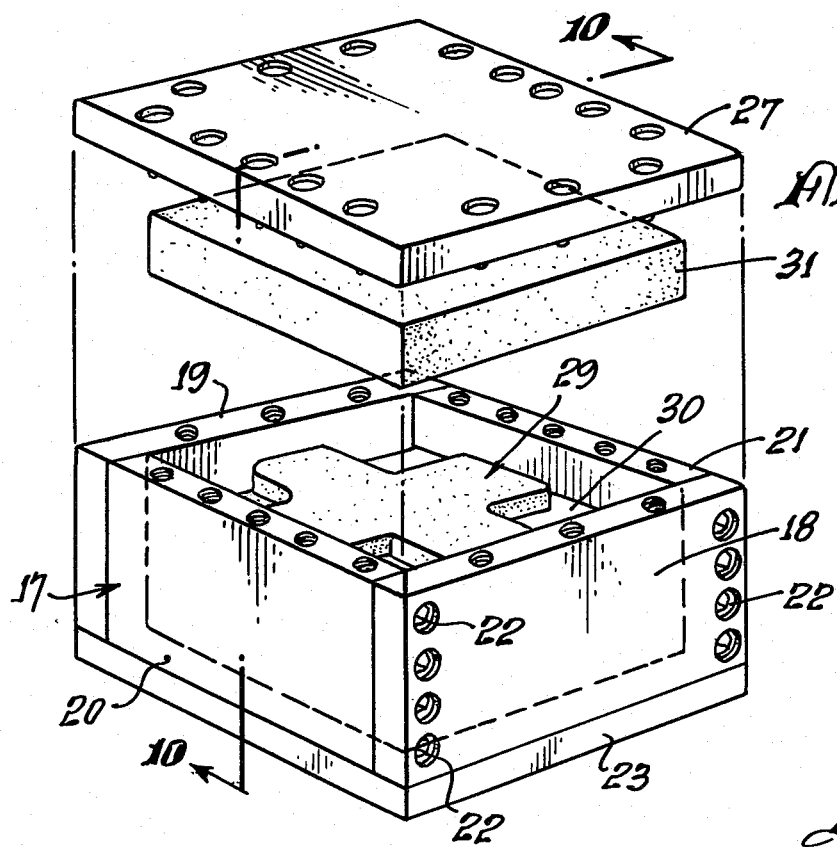
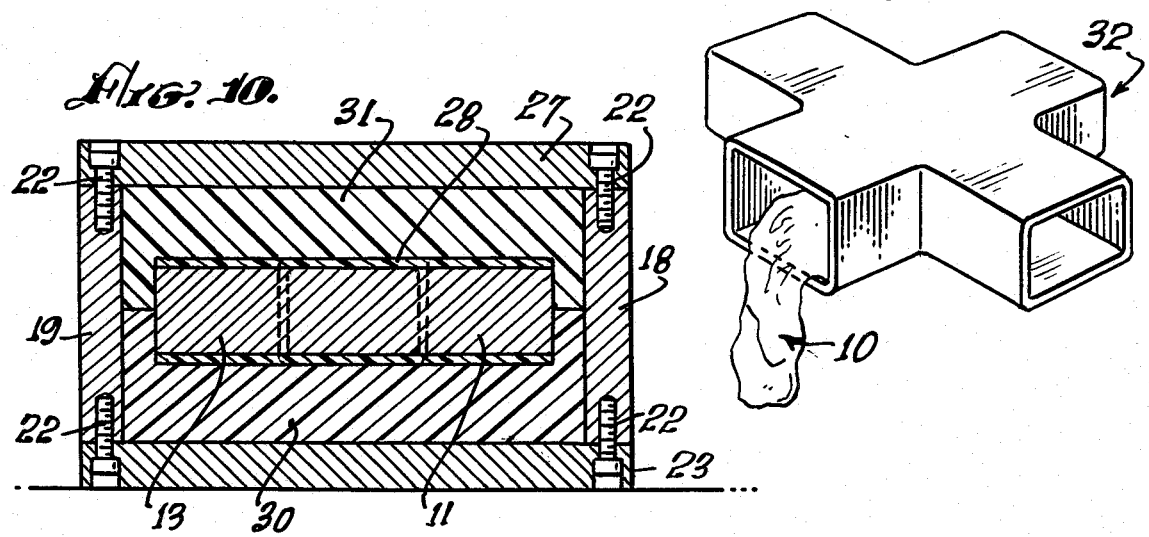

PROCESS FOR FORMING COMPOSITE ARTICLE

BACKGROUND OF THE DISCLOSURE

The field of the invention is processes for forming cured polymeric objects and the invention relates more particularly to processes for forming hollow or other convoluted-shaped articles having an interior shape which makes it difficult to mold by conventional processes.

As technology expands, the ability to create strong, light weight and more thermally-resistant materials has grown to an extent where such materials can often replace metals such as titanium. Where a combination of high strength and low weight exists, composite materials are capable of exhibiting physical characteristics not before believed possible. For instance, it has been known for some time that graphite fiber reinforced composites are capable of exceptionally high modulous combined with low weight. However, it was heretofore not believed possible to create intricate and hollow shapes of such composite materials in view of the need for molding such shapes with high pressure under carefully controlled conditions of temperature.

SUMMARY OF THE INVENTION

It is thus an object of the present invention to provide a process for forming hollow, cured composite articles with a high degree of precision.

The present invention is for a process for forming hollow, cured composite articles beginning with the preparation of a meltable plug having external dimensions equal to the internal shape of the cured composite article. A polymerizable material such as a graphite fiber reinforced epoxy resin is placed over the surface of the plug. The covered plug is then inserted into a cavity formed in a thermally-expansive and heat resistant polymer which, in turn, is held in a rigid container. The container is covered in a secure manner and the assembly is heated thereby causing the polymerizable material to cross link and cure. The cured object with its interior plug is then removed and heated to an extent sufficient to melt the plug thereby leaving the cured composite part. The invention further includes the steps of preparing a cavity in the thermally-expansive and heat-resistant polymer shape into which the polymer covered plug is placed. These steps include the covering of the meltable plug which corresponds to the interior of the composite article to be formed with a removable substance about the thickness of the cured composite article. This covered plug is placed in a closeable, rigid container which does not significantly deform at an internal pressure of 700 psig. The rigid container is then filled with a curable, thermally-expansive and heat-resistant polymer to an extent so that when the rigid container is closed, it will be filled between 90% and 100%. The thermally-expansive polymer is then cured. The cured polymer is then cut or otherwise separated into sufficient parts so that the covered plug can be removed. The polymer parts can be reassembled leaving a cavity into which a polymer-covered plug can be placed. The removable substance is then stripped from the covered plug which may then be coated as set forth above.

BRIEF DESCRIPTION OF THE DRAWINGS

FIG. 1 is a perspective view of the plug of the process of the present invention.

FIG. 2 is a cross-sectional view taken along line 2—2 of FIG. 1.

FIG. 3 is a cross-sectional view similar to FIG. 2 showing the plug covered with a removable substance.

FIG. 4 is a perspective view of the rigid container having the covered plug placed therein.

FIG. 5 is a cross-sectional view of the container and plug of FIG. 4 covered with a curable polymer.

FIG. 6 is a perspective view of the cured, curable polymer showing the covered plug and polymer parts in exploded, perspective view.

FIG. 7 is a cross-sectional view similar to FIG. 3 showing the removable substance partially removed from the plug.

FIG. 8 is a cross-sectional view similar to FIG. 2 showing the meltable plug with a polymerizable material covering the same.

FIG. 9 is an exploded, perspective view showing the rigid container having the thermally-expansive polymer and resin covered plug therein prior to closing.

FIG. 10 is a cross-sectional view of the assembly of FIG. 9 after the rigid container has been closed.

FIG. 11 is a perspective view showing the cured part with the meltable plug being removed therefrom.

DESCRIPTION OF THE PREFERRED EMBODIMENTS

A meltable plug is shown in FIG. 1 in perspective view and indicated generally by reference character 10. The plug may be made from a metal alloy such as a solder and should be made from an alloy which melts at a desired temperature. That is, the melting temperature must be above the curing temperature of the polymer used to fabricate the finished composite article. It is generally preferable that the melting temperature of the plug be about 30 degrees above the cure temperature so that the meltable plug may be removed without subjecting the cured part to a temperature greatly above the temperature at which it was cured. For instance, if the cure temperature of the composite article is 350 degrees F, then the meltable plug should melt at about 380 degrees F. The forming of solder alloys which melt at desired temperatures is well known and need not be set forth herein for an understanding of the present invention. If numerous parts of the same shape are anticipated, it is beneficial to cast the plug in a mold which creates the desired shape without the necessity of excessive machining.

The plug 10 of FIG. 1 is shown in the shape of a cross which is useful in forming an object of the shape shown in FIG. 11. Such shapes may provide a portion of a hollow assembly which may be connected with other appropriate tubes to form a very strong, heat-resistant and light-weight structure. Plug 10 has four arms 11 through 14, and a cross-sectional view of arm 12 is shown in FIG. 2.

In order to form the cavity into which the polymer-covered plug will be placed, plug 10 is covered with a removable coating having a thickness of about equal to the thickness of the final molded part desired. A portion of the coated plug is shown in FIG. 3 where arm 12 has been covered with a wax coating 15. Wax coating 15 should be made from a wax or other substance which will not melt at the temperature at which the thermally-expansive polymer is cured. A wax having a melting temperature of 375 degrees F is suitable for an expansive polymer which cures at 350 degrees F. Although the term "wax" has been used as descriptive of coating 15, the coating need not, of course, be made of wax but could be made of any substance which will withstand the curing temperature of the heat-expansive polymer and which may be readily and completely removed from plug 10.

Next, the wax coated plug, generally indicated by reference character 16 in FIG. 4 is placed in the center of rigid container 17. Container 17 should be fabricated from a strong material such as steel, and container 17 has two steel end plates 18 and 19 which bolt into steel side plates 20 and 21 using bolts indicated generally by reference character 22. Wax coated plug 16 should be held above the base 23 by any suitable means such as pegs 24.

As shown in FIG. 5, a heat or thermally-expansive resin 25 is poured into container 17 from beaker 26. The resin has been referred to herein as heat-expansive or thermally expansive and this property is used in the curing step to provide pressure between the polymerizable substance and the plug in the curing step. One resin which is useful in this application is a high-expansion, silicone rubber such as that sold under the trademark "DAPCOAT". The amount of resin which is placed in the mold should be sufficient so that when the resin is heated to the curing temperature of the part, it forms an internal pressure of about 700 psig. Furthermore, it is preferable that the covered plug fill about one-half of the interior volume of the rigid container. For a cube having an interior diameter of nine inches and the above-described high-expansion, silicone rubber, the resin should come to between one-eighth and one-sixteenth of an inch from the top of the container.

The silicone rubber described above cures at room temperature and is heated to 350 degrees F. to assure that the heat-expansive polymer completely fills the interior of the mold. Since the wax covering 15 does not melt until 375 degrees F, it is not melted by this curing step. The container is then opened and the cured silicone cube which contains covered plug 16 is cut into sufficient pieces so that the wax coated plug may be removed and the rubber parts reassembled to provide the needed cavity.

The wax coating 15 is then peeled away from the part as indicated in FIG. 7 and the part is cleaned to remove all traces of wax. Next, the resin and fiber pre preg is laid onto plug 10. For extreme applications, graphite fibers are used and typically graphite fibers of the type woven into a graphite fabric. Sufficient resin such as an epoxy resin is placed with the graphite fibers to hold the same in a structurally sound configuration.

The graphite fiber/polymerizable resin mixture is indicated by reference character 28 in FIG. 8. The covered plug is indicated by reference character 29. Covered plug 29 is placed in the lower half 30 of the heat-expansive polymer. The mold halves are shown in exploded view in FIG. 6. It should be understood that in practice, the heat expansive polymer would be cut in more than two pieces to assist in the covering of the pre preg coated plug without unnecessary distortion of the pre preg. Depending upon the shape of the part, the heat-expansive polymer may be cut into as many as twelve or more parts but preferably about four parts.

Returning to FIG. 9, resin covered plug 29 is then covered with the upper half of cured heat expansive polymer 31 and cover 27 is bolted in place. A cross-sectional view of the covered assembly is shown in FIG. 10. This assembly is then heated to cure the polymer. Typical curing times would be 350 degrees F. for three hours. This generates an internal pressure of about 700 pounds per square inch resulting in an exceptionally dense composite material in the final part.

The assembly is then cooled and cover 27 is removed. The sides ar also removed and the part with its internal solder core is removed. Lastly, the cured composite article 32 is placed in an oven and heated to a temperature sufficient to melt the solder plug 10 from within part 32. Final part 32 has exceptionally accurate internal dimensions since plug 10 can be formed with a high degree of precision. Furthermore, all parts of the part 32 are cured under the same pressure since the heat-expansive polymer is sufficiently pliable to exert pressure equally on all surfaces of the pre preg. The prior art vacuum bag approach tends to lead to greater pressures on some surfaces than others and often creates an undesirable flow at corners. Furthermore, since the pre preg is often laid up having fibers on defined angles, it is important that the pre preg not move during the early stages of the cure. The equal pressure exerted on the curing part by the practice of the present invention avoids such movement and results in a part of optimum strength. The polymer parts such as parts 30 and 31 may, of course, be reused many times and thus the process of the present invention in its broadest sense contemplates the use of these parts without the necessity of forming them anew with each part.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for forming a hollow, cured composite article comprising the steps of:
   preparing a meltable plug having external dimensions equal to the internal shape of the cured composite article;
   placing a polymerizable material about that portion of the plug which corresponds to the interior of the composite article to be formed;
   inserting the polymerizable-material-covered plug into a cavity formed in a thermally-expansive and heat-resistant polymer and placing the polymer and plug assembly into a rigid container;
   affixing the cover over the container and heating the contents of the container thereby causing the thermally-expansive polymer to expand and the polymerizable polymer to crosslink;
   cooling the contents of the container;
   removing the plug and its cross-linked covering from the container and from the cavity; and
   heating the plug and its composite material part to a temperature sufficient to melt the plug thereby leaving a cured composite part.

2. The process of claim 1 further including, after said preparing step, the steps of:
   covering that portion of the plug which corresponds to the interior of the composite article to be formed with a removable substance about the thickness of the cured composite article thereby forming a covered plug;

placing the covered plug into a closeable, rigid container which does not significantly deform at an internal pressure of 700 psig;

filling the rigid container with a curable, thermally-expansive and heat-resistant polymer to an extent so that when the rigid container is closed, it will be filled between 90% and 100%;

curing the thermally-expansive polymer;

separating the cured polymer into sufficient parts so that the covered plug can be removed without tearing the cured polymer;

removing the covered plug from the polymer thereby leaving a cavity in the polymer; and removing the removable substance from the covered plug.

3. The process of claim 1 wherein said rigid container has removable sides.

4. The process of claim 1 wherein said thermally-expansive polymer is a silicone polymer.

5. The process of claim 1 wherein said polymerizable matter is an epoxy resin.

6. The process of claim 5 wherein said polymerizable material further includes reinforcing fibers.

7. The process of claim 6 wherein said reinforcing fibers are graphite fibers.

8. The process of claim 1 wherein said meltable plug is fabricated from a metallic alloy.

9. A process for forming a mold form forming a cured composite article comprising the steps of:

preparing a meltable plug having external dimensions equal to the internal shape of the cured composite article;

covering that portion of the plug which corresponds to the interior of the composite article to be formed with a removable substance about the thickness of the cured composite article thereby forming a covered plug;

placing the covered plug into a closeable, rigid container which does not significantly deform at an internal pressure of 700 psig;

filling the rigid container with a curable, thermally-expansive and heat-resistance polymer to an extent so that when the rigid container is closed, it will be filled between 90% and 100%;

curing the thermally-expansive polymer;

separating the cured polymer into sufficient parts so that the covered plug can be removed without tearing the cured polymer;

removing the covered plug from the polymer thereby leaving a cavity in the polymer; and removing the removable substance from the covered plug.

10. The process of claim 9 wherein said removable substance is fabricated from a wax.

11. The process of claim 9 wherein said thermally-expansive polymer is a silicone polymer.

12. The process of claim 9 wherein said rigid container has removable sides.

* * * * *